(12) United States Patent
Wu et al.

(10) Patent No.: US 9,191,079 B2
(45) Date of Patent: Nov. 17, 2015

(54) WIRELESS COMMUNICATION SYSTEM AND BEAMFORMING TRAINING METHOD FOR WIRELESS COMMUNICATION SYSTEM

(75) Inventors: Ye Wu, Beijing (CN); Ming Lei, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 64 days.

(21) Appl. No.: 13/704,179

(22) PCT Filed: Jun. 14, 2011

(86) PCT No.: PCT/CN2011/000987
§ 371 (c)(1),
(2), (4) Date: Dec. 13, 2012

(87) PCT Pub. No.: WO2012/037769
PCT Pub. Date: Mar. 29, 2012

(65) Prior Publication Data
US 2013/0083865 A1    Apr. 4, 2013

(30) Foreign Application Priority Data

Sep. 26, 2010  (CN) .......................... 2010 1 0295272

(51) Int. Cl.
*H04B 7/06* (2006.01)
*H04B 7/04* (2006.01)
*H04B 7/08* (2006.01)

(52) U.S. Cl.
CPC ............ *H04B 7/0408* (2013.01); *H04B 7/0426* (2013.01); *H04B 7/0613* (2013.01); *H04B 7/0617* (2013.01); *H04B 7/0619* (2013.01); *H04B 7/0851* (2013.01); *H04B 7/0452* (2013.01)

(58) Field of Classification Search
CPC .. H04B 7/0413; H04B 7/0619; H04B 7/0408; H04B 7/0426; H04B 7/0851; H04B 7/0617; H04B 7/0452; H04B 7/0613; H04B 7/0615; H04B 7/0684; H04B 7/0634

USPC ......... 375/219, 224, 259–260, 267, 295, 299, 375/319, 347; 370/241, 252, 310

See application file for complete search history.

(56) References Cited

U.S. PATENT DOCUMENTS 7,302,231 B2 * 11/2007 Sun .............................. 455/63.1
8,599,804 B2 * 12/2013 Erceg et al. ................... 370/338
(Continued)

FOREIGN PATENT DOCUMENTS

CN      101273389 B     4/2010
JP      2005-020216 A   1/2005
(Continued)

OTHER PUBLICATIONS

International Search Report of PCT/CN2011/000987 dated Sep. 22, 2011.
(Continued)

*Primary Examiner* — Jean B Corrielus
(74) *Attorney, Agent, or Firm* — Sughrue Mion, PLLC

(57) ABSTRACT

The invention provides a wireless communication system and a beamforming training method for a wireless communication system. A wireless communication system comprising: a plurality of transmitting stations each including a transmit antenna array, the plurality of transmitting stations transmitting training sequences via the respective transmit antenna arrays in the same period of time; and a plurality of receiving stations corresponding to the plurality of transmitting stations respectively and each including a receive antenna array, each of the plurality of receiving stations receiving the respective training sequences transmitted by the plurality of transmitting stations via the respective receive antenna array and acquiring channel information regarding channel conditions of the respective links between the receiving station and the respective ones of the plurality of transmitting stations, the channel information being used to determine at least one of optimized transmit antenna weight vectors of the transmit antenna arrays of the plurality of transmitting stations and optimized receive antenna weight vectors of the receive antenna arrays of the plurality of receiving stations.

18 Claims, 9 Drawing Sheets

(56) References Cited

U.S. PATENT DOCUMENTS

| | | | |
|---|---|---|---|
| 2003/0123530 A1* | 7/2003 | Maeda et al. | 375/148 |
| 2004/0233867 A1* | 11/2004 | Wheatley et al. | 370/328 |
| 2004/0258095 A1* | 12/2004 | Olivier | 370/497 |
| 2005/0135517 A1* | 6/2005 | Coffey et al. | 375/347 |
| 2006/0140290 A1* | 6/2006 | Li et al. | 375/260 |
| 2007/0009016 A1* | 1/2007 | Tsutsui | 375/219 |
| 2007/0091985 A1* | 4/2007 | Mesecher | 375/141 |
| 2007/0135166 A1* | 6/2007 | Ding et al. | 455/561 |
| 2008/0152052 A1* | 6/2008 | Thomas | 375/346 |
| 2008/0274727 A1* | 11/2008 | Axnas et al. | 455/423 |
| 2009/0067389 A1* | 3/2009 | Lee et al. | 370/336 |
| 2009/0239486 A1* | 9/2009 | Sugar et al. | 455/101 |
| 2009/0290616 A1* | 11/2009 | Sridhara et al. | 375/146 |
| 2009/0310526 A1* | 12/2009 | Gore et al. | 370/312 |
| 2009/0318091 A1 | 12/2009 | Wang et al. | |
| 2010/0103893 A1* | 4/2010 | Xia et al. | 370/329 |
| 2010/0128679 A1* | 5/2010 | Kwon | 370/329 |
| 2010/0272054 A1* | 10/2010 | Tatsuta et al. | 370/329 |
| 2010/0290449 A1* | 11/2010 | van Nee et al. | 370/338 |
| 2010/0304666 A1* | 12/2010 | Hottinen et al. | 455/7 |
| 2010/0323748 A1* | 12/2010 | Padovani et al. | 455/522 |
| 2011/0256828 A1* | 10/2011 | Hsu et al. | 455/13.1 |
| 2012/0026952 A1* | 2/2012 | Okubo et al. | 370/329 |
| 2012/0281684 A1* | 11/2012 | Shimomura et al. | 370/336 |

FOREIGN PATENT DOCUMENTS

| | | |
|---|---|---|
| JP | 2010-518741 A | 5/2010 |
| JP | 2011-508576 A | 3/2011 |
| WO | 2008/097150 A9 | 8/2008 |
| WO | 2009/084904 A2 | 7/2009 |

OTHER PUBLICATIONS

Communication dated Mar. 18, 2014, issued by the Japanese Patent Office in corresponding Application No. 2013-522069.

* cited by examiner

FIG. 8

TS$_1$: | CYCLIC PREFIX | Ga$_1$ | Ga$_2$ | ... | Ga$_{N\_MAX}$ | CYCLIC POSTFIX | CYCLIC PREFIX | Gb$_1$ | Gb$_2$ | ... | Gb$_{N\_MAX}$ | CYCLIC POSTFIX |

TS$_2$: | CYCLIC PREFIX | Ga$_{N\_MAX}$ | Ga$_1$ | ... | Ga$_{N\_MAX-1}$ | CYCLIC POSTFIX | CYCLIC PREFIX | Gb$_{N\_MAX}$ | Gb$_1$ | ... | Gb$_{N\_MAX-1}$ | CYCLIC POSTFIX |

TS$_i$ (i = 3, ..., N): | CYCLIC PREFIX | Ga$_{N\_MAX-i+2}$ | Ga$_{N\_MAX-i+3}$ | ... | Ga$_{N\_MAX-i+1}$ | CYCLIC POSTFIX | CYCLIC PREFIX | Gb$_{N\_MAX-i+2}$ | Gb$_{N\_MAX-i+3}$ | ... | Gb$_{N\_MAX-i+1}$ | CYCLIC POSTFIX |

FIG. 9

WIRELESS COMMUNICATION SYSTEM AND BEAMFORMING TRAINING METHOD FOR WIRELESS COMMUNICATION SYSTEM

FIELD OF THE INVENTION

The invention generally relates to wireless communication, and in particular, to a wireless communication system and a beamforming training method for a wireless communication system.

BACKGROUND

Beamforming (BF) is a diversity technique making the most of multi-antenna arrays. For millimeter-wave systems, e.g. 60 GHz wireless personal area network (WPAN)/wireless local area network (WLAN) systems, beamforming becomes extremely important due to the high path loss coherent to the systems. Different antenna configurations, such as sectored antennas, 1D/2D phased antenna array and the like, are capable of supporting beamforming. For 60 GHz application, a CMOS-based low-cost phased antenna array, expected to support around 30 dBi antenna gain, is regarded as the effective way to combat high path loss at 60 GHz spectrum.

Recent physical (PHY) layer standards of 60 GHz, such as Wireless HD, Wigig, and IEEE 802.11ad, all support both single carrier and orthogonal frequency division multiplexing (OFDM) transmission modes. However, from a beamforming point of view, the two transmission modes are almost not different in implementation.

Beamforming training is necessary for a pair of communication stations communicating with each other to achieve the optimum transmit antenna weight vectors (TX AWVs, also known as transmit beamforming vectors) and receive antenna weight vectors (RX AWVs, also known as receive beamforming vectors).

US Patent Application Publication US20090318091 A1 discloses a system that makes use of a concatenated training sequence for one-to-many simultaneous beamforming training. In the system, a transmitting station first generates a concatenated training sequence composed of n sub training sequences. When each sub training sequence is transmitted through a transmit antenna array including a plurality of antenna elements, a unique TX AWV is applied to differentiate the phases on these plurality of antenna elements, such that the transmitted sub training sequence has a unique beam pattern.

The transmitting station transmits this concatenated training sequence for the simultaneous training of multiple receiving stations. Based on certain metrics, such as capacity or signal-to-noise-ratio (SNR), each of these receiving stations determines an optimum TX AWV for the receiving station and feeds it back to the transmitting station.

Based on a codebook (CB) or other rules, the plurality of TX AWVs applied by the transmitting station are predetermined, and are known to the transmitting station and the plurality of receiving stations under training. Therefore, it is easy for the plurality of receiving stations to feedback their respective optimum TX AWVs.

In a typical IEEE 802.11ad dense-user conference room environment, where multiple pairs of stations need to transmit and receive data simultaneously and a personal basic service set (PBSS) control point (PCP) acts as a network coordinator (CDNT) of all stations. Since the multiple pairs of stations need to perform proactive/on-demand beamforming training, time division multiplexing access (TDMA) contention based one-by-one training method will be too time-consuming. In other words, in prior art, multiple communication pairs must perform beamforming training in different periods of time, which is time-consuming and lacks spectral efficiency.

SUMMARY OF THE INVENTION

In order to solve the above problems, the invention provides a wireless communication system and a beamforming training method for a wireless communication system.

According to an aspect of the invention, there is provided a wireless communication system, comprising: a plurality of transmitting stations each including a transmit antenna array, the plurality of transmitting stations transmitting training sequences via the respective transmit antenna arrays in the same period of time; and a plurality of receiving stations corresponding to the plurality of transmitting stations respectively and each including a receive antenna array, each of the plurality of receiving stations receiving the respective training sequences transmitted by the plurality of transmitting stations via the respective receive antenna array and acquiring channel information regarding channel conditions of the respective links between the receiving station and the respective ones of the plurality of transmitting stations, the channel information being used to determine at least one of optimized transmit antenna weight vectors of the transmit antenna arrays of the plurality of transmitting stations and optimized receive antenna weight vectors of the receive antenna arrays of the plurality of receiving stations.

According to another aspect of the invention, there is provided a method for conducting beamforming training in a wireless communication system including a plurality of transmitting stations and a plurality of receiving stations corresponding to the plurality of transmitting stations respectively, comprising: a training sequence transmitting step in which the plurality of transmitting stations transmit training sequences via the respective transmit antenna arrays in the same period of time; a training sequence receiving step in which each of the plurality of receiving stations receives the respective training sequences transmitted by the plurality of transmitting stations via the respective receive antenna array; a channel information acquiring step of acquiring channel information regarding channel conditions of the respective links between each of the plurality of receiving stations and the respective ones of the plurality of transmitting stations; and an optimized antenna weight vector determining step of determining, based on the channel information, at least one of optimized transmit antenna weight vectors of the transmit antenna arrays of the plurality of transmitting stations and optimized receive antenna weight vectors of the receive antenna arrays of the plurality of receiving stations.

DESCRIPTION OF THE DRAWINGS

The embodiments of the invention are shown in the accompanying drawings by way of example rather than limitation. Same or similar reference signs denote same or similar elements throughout the drawings.

FIG. 8 shows an example of training sequences that can be used in the invention.

FIG. 9 shows another example of training sequences that can be used in the invention.

DETAILED DESCRIPTION

The embodiments of the invention will be described in detail below with reference to the accompanying drawings.

In general, the invention provides a wireless communication system and a method for conducting proactive or on-demand simultaneous beamforming training in the wireless communication system.

Figure 1:
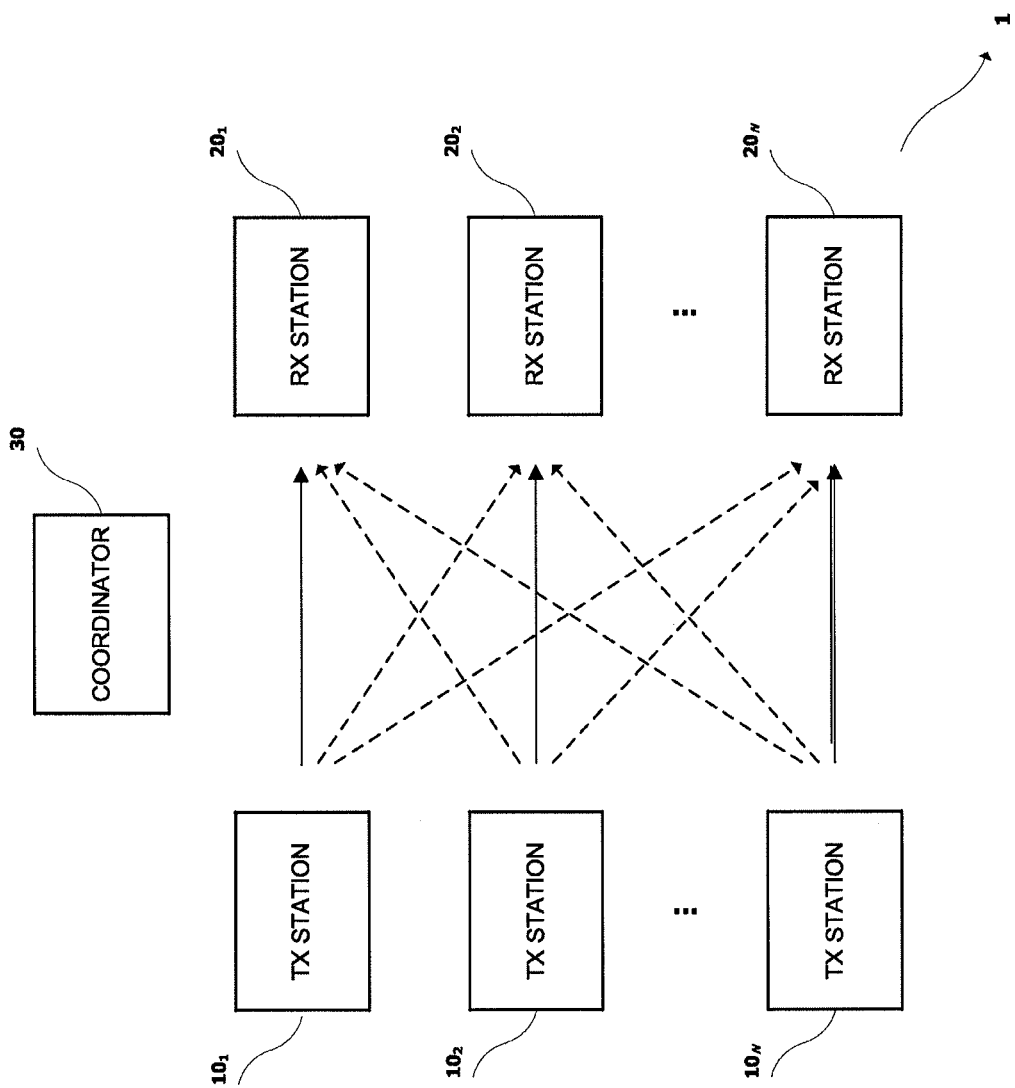
FIG. 1 shows a schematic diagram of a wireless communication system in the case of proactive beamforming training.

FIG. 1 shows a schematic diagram of a wireless communication system 1 in the case of proactive beamforming training.

As shown in FIG. 1, the wireless communication system 1 includes N communication stations as transmitting parties (simply referred to as transmitting stations or TX stations hereinafter) $10_1$, $10_2$, ..., and $10_N$ and N communication stations as receiving parties (simply referred to as receiving stations or RX stations hereinafter) $20_1$, $20_2$, ..., and $20_N$, N being an integer larger than 1.

The transmitting stations $10_1$, $10_2$, ..., and $10_N$ and the receiving stations $20_1$, $20_2$, ..., and $20_N$ correspond to each other, respectively, thus forming N communication pairs. That is, the transmitting stations $10_1$, $10_2$, ..., and $10_N$ and the receiving stations $20_1$, $20_2$, ..., and $20_N$ are intended to perform one-to-one wireless communication. For example, the transmitting station $10_1$ will transmit wireless signals to the receiving station $20_1$, and they thus constitute the $1^{st}$ communication pair; the transmitting station $10_2$ will transmit wireless signals to the receiving station $20_2$, and they thus constitute the $2^{nd}$ communication pair; ; and so on, and the transmitting station $10_N$ will transmit wireless signals to the receiving station $20_N$, and they thus constitute the $N^{th}$ communication pair.

In addition, in the wireless communication system 1, the receiving station $20_i$ of the $i^{th}$ communication pair, in addition to receiving wireless signals transmitted from the transmitting station $10_i$ via a wireless link between the receiving station $20_i$ and the transmitting station $10_i$ (which may be referred to as the "own link" of the $i^{th}$ communication pair and is indicated by a solid line in FIG. 1), can also receive wireless signals transmitted from another transmitting station $10_q$ via a wireless link between the receiving station $20_i$ and the other transmitting station $10_q$ (i=1, 2, ..., N, q=1, 2, ..., N, and q≠i) (which may be referred to as the "cross link" of the $i^{th}$ communication pair and is indicated by a dashed line in FIG. 1).

Each of the transmitting stations $10_1$, $10_2$, ..., and $10_N$ includes a transmit antenna array for transmitting wireless signals, and the transmit antenna array may include a plurality of antenna elements. Here, it is assumed that the transmit antenna array of the transmitting station $10_i$ (i=1, 2, ..., N) includes $t_i$ antenna elements, where $t_i$ is an integer larger than 1.

Each of the receiving stations $20_1$, $20_2$, ..., and $20_N$ includes a receive antenna array for receiving wireless signals, and the receive antenna array may include a plurality of antenna elements. Here, it is assumed that the receive antenna array of the receiving station $20_i$ (i=1, 2, ..., N) includes $r_i$ antenna elements, where $r_i$ is an integer larger than 1.

To perform beamforming, at a transmitting station, phase-shifting and possibly amplitude-scaling are applied to each antenna element in the transmit antenna array; and at a receiving station, phase-shifting and possibly amplitude-scaling are applied to each antenna element in the receive antenna array.

The antenna weight vector (AWV) can also be referred to as beamforming vector, and describes the phase-shifting (and possibly amplitude-scaling) applied to each antenna element in the antenna array when beamforming is performed. Below, an antenna weight vector of the transmit antenna array of a transmitting station can also be simply referred to as TX AWV, and an antenna weight vector of the receive antenna array of a receiving station can also be simply referred to as RX AWV.

At one transmitting station, multiple different transmit antenna weight vectors may be used. These antenna weight vectors that each transmitting station can use constitute a matrix, and each column (or row) of the matrix is an antenna weight vector. This matrix is called a transmit codebook or simply TX codebook. In an embodiment, the TX codebook of the transmitting station is a square matrix. That is, the number of TX AWVs of the transmitting station equals to the number of transmit antenna elements included in the transmit antenna array of the transmitting station. In an embodiment, the TX codebook may take the form of a unitary matrix, with the number of columns of the matrix equal to the number of antenna elements included in the transmit antenna array of the corresponding transmitting station. For example, for i=1, 2, ..., N, the TX codebook $W_i$ of the transmitting station $10_i$ whose transmit antenna array includes $t_i$ antenna elements may be a discrete Fourier matrix as shown in Equation 1 below:

$$W_i = \frac{1}{\sqrt{t_i}} \begin{bmatrix} w_i^0 & w_i^1 & \vdots & w_i^{t_i-1} \\ w_i^0 & w_i^2 & \vdots & w_i^{2(t_i-1)} \\ \vdots & \vdots & \vdots & \vdots \\ w_i^0 & w_i^{t_i} & \vdots & w_i^{t_i(t_i-1)} \end{bmatrix} = [w_{i,1} \; w_{i,2} \; \ldots \; w_{i,k} \; \ldots w_{i,t_i}] \quad \text{(Equation 1)}$$

where $w_i = e_{-j2\pi/t_i}$, and $j=\sqrt{-1}$. The $k^{th}$ column $w_{i,k}$ of W, is the $k^{th}$ transmit antenna weight vector, where k=1, 2, ..., $t_i$. As will be appreciated by those skilled in the art, the TX codebook is not limited to the above example, and can take other forms. Note that $[.]^T$ herein denotes the transpose of a vector or matrix, and $[.]^H$ denotes the Hermitian conjugate of a vector or matrix.

Similarly, at one receiving station, multiple different receive antenna weight vectors may be used. These antenna weight vectors that each receiving station can use constitute a matrix, and each column (or row) of the matrix is an antenna weight vector. This matrix is called a receive codebook or simply RX codebook. In an embodiment, the RX codebook of the receiving station is a square matrix. That is, the number of RX AWVs of the receiving station equals to the number of receive antenna elements included in the receive antenna array of the receiving station. In an embodiment, the RX codebook may take the form of a unitary matrix, with the number of columns of the matrix equal to the number of antenna elements included in the receive antenna array of the corresponding receiving station. For example, for i=1, 2, . . . , N, the RX codebook $D_i$ of the receiving station $20_i$ whose receive antenna array includes $r_i$ antenna elements may be a discrete Fourier matrix as shown in Equation 2 below:

$$D_i = \frac{1}{\sqrt{r_i}} \begin{bmatrix} d_i^0 & d_i^1 & \vdots & d_i^{r_i-1} \\ d_i^0 & d_i^2 & \vdots & d_i^{2(r_i-1)} \\ \vdots & \vdots & \vdots & \vdots \\ d_i^0 & d_i^{r_i} & \vdots & d_i^{r_i(r_i-1)} \end{bmatrix} = [d_{i,1} \ d_{i,2} \ \ldots \ d_{i,k} \ \ldots d_{i,r_i}] \quad \text{(Equation 2)}$$

where $d_i = e^{-j2\pi/r_i}$, and $j = \sqrt{-1}$. The $k^{th}$ column $d_{i,k}$ of $D_i$ is the $k^{th}$ receive antenna weight vector, where k=1, 2, . . . , $r_i$. As will be appreciated by those skilled in the art, the RX codebook is not limited to the above example, and can take other forms.

The wireless communication system 1 further includes a coordinator 30, which is the control/coordination point in the wireless communication system 1 and is responsible for controlling and coordinating of all the transmitting stations $10_1$, $10_2$, . . . , and $10_N$ and receiving stations $20_1$, $20_2$, . . . , and $20_N$.

In an implementation, the transmitting stations $10_1$, $10_2$, . . . , and $10_N$ and the receiving stations $20_1$, $20_2$, . . . , and $20_N$ constitute a basic service set (BBS)/personal basic service set (PBSS). In this case, the coordinator 30 is the access point (AP) in the BSS or the control and coordination point (PCP) in the PBSS, and the stations communicate with each other via the coordinator 30.

In the wireless communication system 1, multiple pairs of transmitting stations and receiving stations can perform wireless communication simultaneously, and as described above, each receiving station not only can receive wireless signals transmitted from the transmitting station corresponding thereto (i.e., the transmitting station with which the receiving station is intended to communicate), but also can receive wireless signals transmitted from other transmitting stations. In order that the receiving station $20_i$ can receive the signals (the signals of the own link) transmitted from the transmitting station $10_i$ with a quality as high as possible, and be subject to interferences from the cross links as small as possible, beamforming training may be performed on the transmit antenna array of the transmitting station $10_i$ and the receive antenna array of the receiving station $20_i$ to determine the optimized TX AWVs and the optimized RX AWVs.

In the invention, the transmitting stations $10_1$, $10_2$, . . . , and $10_N$ transmit training sequences (TS) at substantially the same time through the respective transmit antenna arrays in the same time period, and each of the receiving stations $20_1$, $20_2$, . . . , and $20_N$ receives each of the training sequences transmitted by each of the transmitting stations $10_1$, $10_2$, . . . , and $10_N$ through the respective receive antenna array, and obtain information related to channel conditions of each of the links (including the own link and the cross links) between the receiving station and the respective transmitting stations $10_1$, $10_2$, . . . , and $10_N$ (which may be called channel information). Then, the information is used for determining the optimized TX AWVs of the transmit antenna arrays of the transmitting stations $10_1$, $10_2$, . . . , and $10_N$ and the optimized RX AWVs of the receive antenna arrays of the receiving stations $20_1$, $20_2$, . . . , and $20_N$. This will be described in detail below.

As can be understood by those skilled in the art, the training sequences herein may be preamble sequences contained in the frames transmitted and received in the system.

Figure 2:
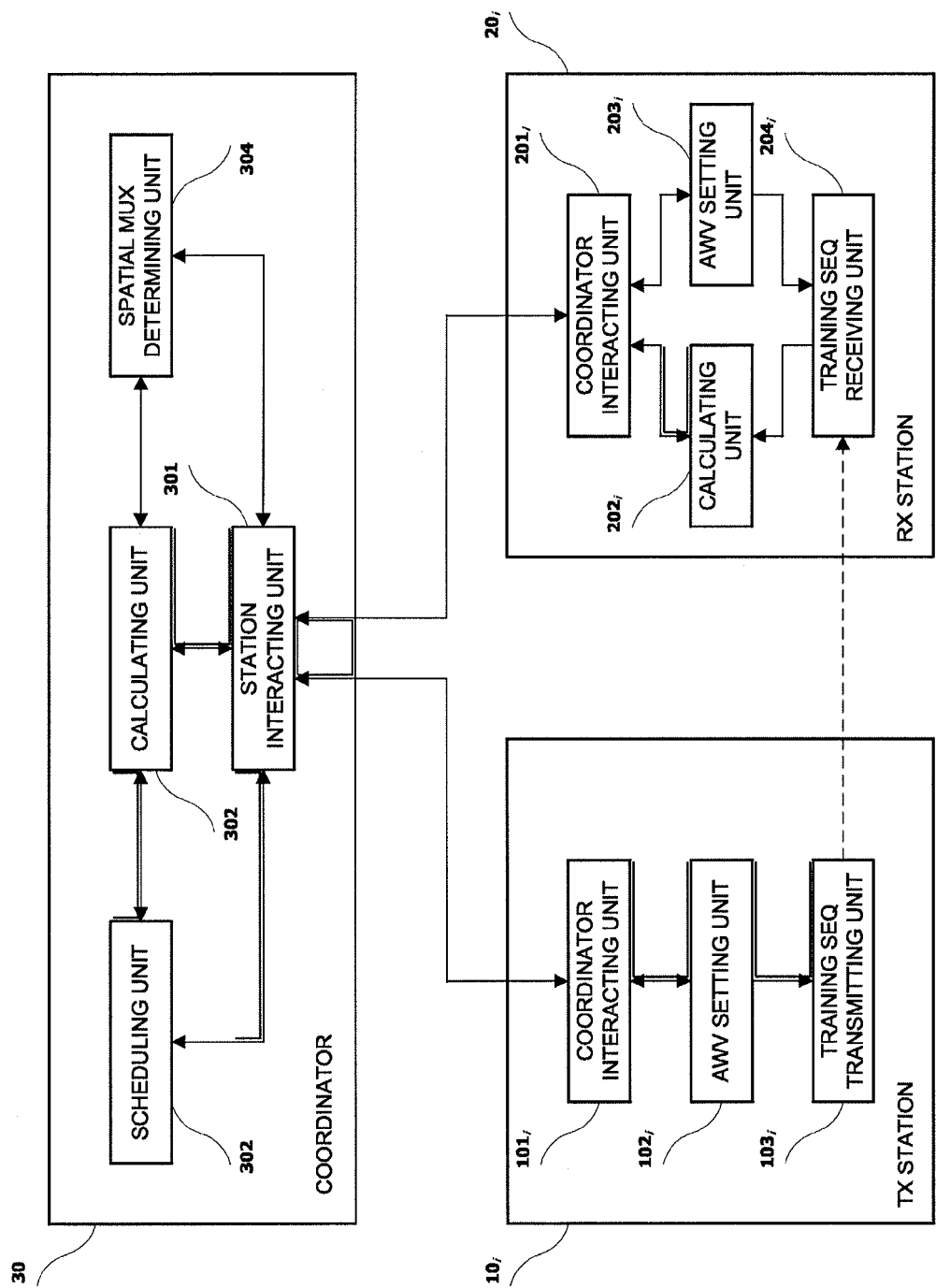
FIG. 2 shows an example functional block diagram of a coordinator, a transmitting station and a receiving station in the wireless communication system shown in FIG. 1.

FIG. 2 shows an example functional block diagram of a coordinator, a transmitting station and a receiving station in the wireless communication system 1. As an example, FIG. 2 only shows a pair of transmitting station $10_i$, and receiving station $20_i$, and other transmitting stations and receiving stations may have the similar functional configuration.

The transmitting station $10_i$ includes a coordinator interacting unit $101_i$, an AWV setting unit $102_i$, and a training sequence transmitting unit $103_i$. The coordinator interacting unit $101_i$ is used to transmit a request to the coordinator 30, and to receive the scheduled time slot, training sequence indices and optimized TX AWVs, spatial multiplexing indication, etc. notified from the coordinator 30. The AWV setting unit $102_i$ is used to set the antenna weight vectors of the transmit antenna array (not shown in FIG. 2) of the transmitting station $10_i$. The training sequence transmitting unit $103_i$ is used to transmit training sequences via the transmit antenna array of the transmitting station $10_i$ based on the setting made by the AWV setting unit $102_i$.

The receiving station $20_i$ includes a coordinator interacting unit $201_i$, a calculating unit $202_i$, an AWV setting unit $203_i$ and a training sequence receiving unit $204_i$. The coordinator interacting unit $201_i$ is used to feedback channel information etc. to the coordinator 30, and to receive the scheduled time slot, training sequence indices, spatial multiplexing indication, etc. notified from the coordinator 30. The AWV setting unit $203_i$ is used to set the antenna weight vectors of the receive antenna array (not shown in FIG. 2) of the receiving station $20_i$. The training sequence receiving unit $204_i$ is used to receive training sequences transmitted from the transmitting stations in the system via the receive antenna array of the receiving station $20_i$ based on the setting made by the AWV setting unit $203_i$. Furthermore, the calculating unit $202_i$ is used to estimate the channel response of each of the links (including the own link and cross links) between the receiving station and the respective transmitting stations based on the training sequences received by the training sequence receiving unit $204_i$, and to calculate the received signal to interference and noise ratio (SINR) of the own link, the optimized RX AWVs of the own receiving station, etc.

The coordinator 30 includes a station interacting unit 301, a scheduling unit 302, a calculating unit 303, and a spatial multiplexing determining unit 304. The station interacting unit 301 is used to receive requests and feedback information transmitted from the stations, and to transmit notifications to the stations, etc. The scheduling unit 302 schedules spatial-multiplexing-based simultaneous beamforming training in accordance with SP availability. The calculating unit 303 calculates the optimized TX AWVs of each transmitting station, the transmitted signal to leakage and noise ratio (SLNR) of each link, etc. based on the information fed back from the stations. The spatial multiplexing determining unit 304 is used to determine whether or not a spatial multiplexing can be conducted based on the information fed back from the stations, the calculation result of the calculating unit 303, etc.

Next, a process flow in the case where proactive simultaneous beamforming training is performed in the wireless communication system 1 will be described with reference to FIGS. 1-4.

Figure 3:
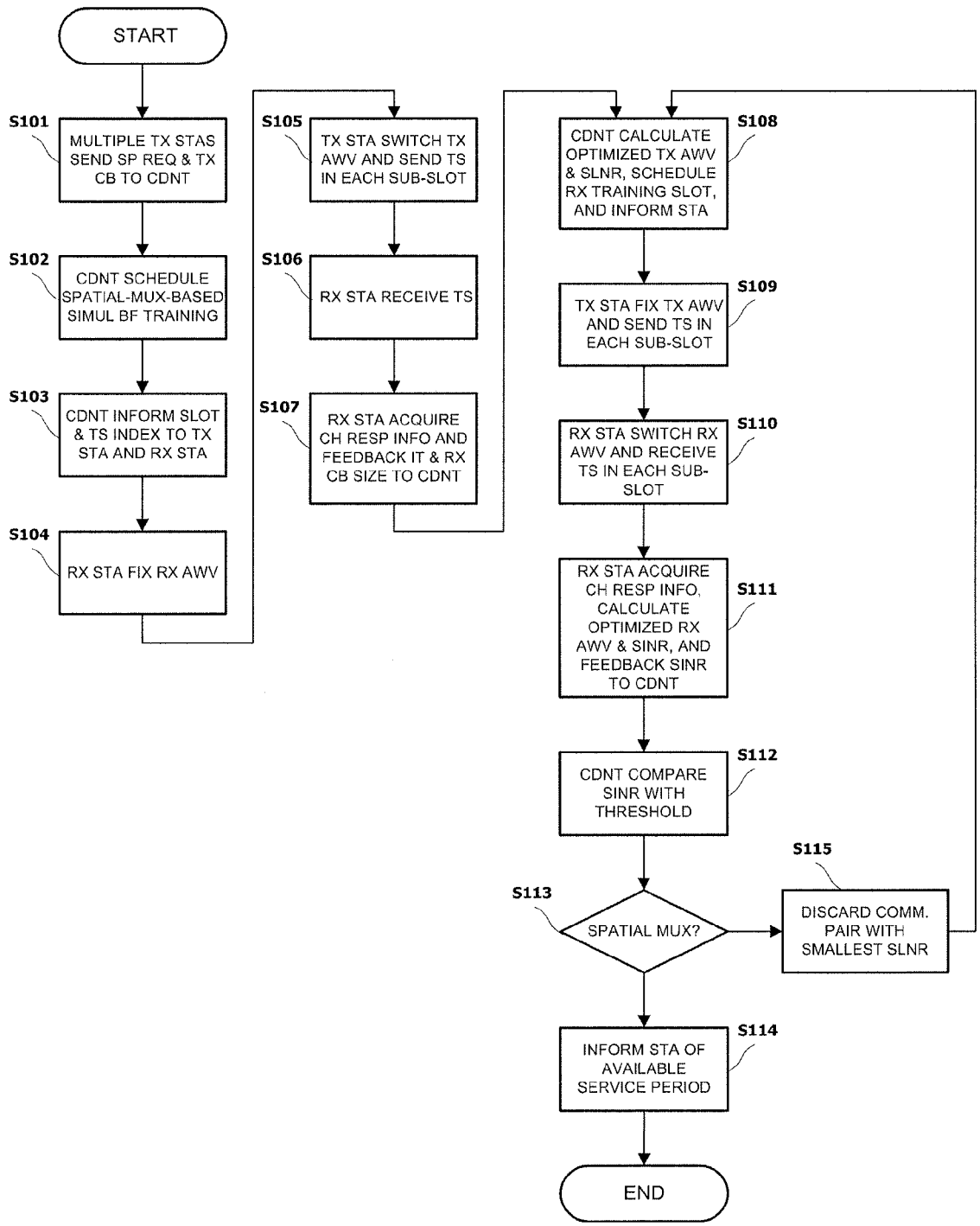
FIG. 3 shows a flow chart of a method for proactive simultaneous beamforming training according a first embodiment of the invention.

FIG. 3 shows a flow chart of a method for proactive simultaneous beamforming training according a first embodiment of the invention.

During the initialization stage (which may comprise steps S101-S103), in step S101, the transmitting stations $10_1$, $10_2$, ..., and $10_N$ of N communication pairs in the wireless communication system 1 as shown in FIG. 1 transmit a service period (SP) request and each one's TX codebook to the coordinator 30 as service initiator. For example, a transmitting station $10_i$ of the $i^{th}$ communication pair (i=1, 2, ..., N) may transmit a service period (SP) request and its TX codebook to the coordinator 30 via its coordinator interacting unit $101_i$. $W_1$ of the transmitting station $10_i$ may be as shown in the Equation (1) above. Note that there would be no need for transmitting stations to transmit the TX codebooks to the coordinator 30 if the coordinator 30 has previously been informed of the TX codebook of each of the transmitting stations in the system by a certain method.

In step S102, upon receiving proactive SP requests from transmitting stations $10_1$, $10_2$, ..., and $10_N$ of respective communication pairs, the coordinator 30 schedules spatial-multiplexing-based simultaneous beamforming training in accordance with SP availability. For example, the coordinator 30 may receive SP requests and TX codebooks via its station interacting unit 301, and schedule spatial-multiplexing-based simultaneous beamforming training using its scheduling unit.

Once spatial multiplexing is decided, in step S103, the coordinator 30 informs the scheduled time slots and training sequence indices allocated for each of the communication pairs to the service initiators (transmitting stations $10_1$, $10_2$, ..., and $10_N$) and the service responders (receiving stations $20_1$, $20_2$, ..., and $20_N$) of the plurality of communication pairs. For example, the coordinator 30 may inform the aforementioned time slots and indices to each of the transmitting stations $10_1$, $10_2$, ..., and $10_N$ and receiving stations $20_1$, $20_2$, ..., and $20_N$ via its station interacting unit 301.

In one embodiment, the scheduled time slots are transmitting training slots, including TN transmitting training sub-slots. TN equals to the maximum number of columns of the TX codebook matrices of all N transmitting stations $10_1$, $10_2$, ..., and $10_N$ in the wireless communication system 1, that is, equals to the number of transmit antenna elements of the transmitting station having the most transmit antenna elements.

Further, in order to simplify the description, it is assumed herein that the training sequence index allocated to the $i^{th}$ communication pair equals to the index i allocated to that communication pair in FIG. 1 for illustration. However, those skilled in the art would understand that the present invention is not limited thereto.

Once being informed of the training sequence index allocated to the $i^{th}$ communication pair, the transmitting station $10_i$ and the receiving station $20_i$ may derive the training sequence allocated to that communication pair. Thus, since the training sequence is known to both the transmitting stations and the receiving stations, each of the receiving stations may estimate the channel response between itself and each of the transmitting stations upon receiving a training sequence. Further, in the present invention, since the training sequences used by the communication pairs are orthogonal to each other, each of the receiving stations may distinguish whether a training sequence is transmitted from the transmitting station to which it corresponds or from other transmitting stations upon receiving the training sequence.

$TS_i$ is used to represent the training sequence allocated to the $i^{th}$ communication pair, and the training sequence may include M symbols. Here it is assumed that the lengths of training sequences of N communication pairs in the system are all M. Typically, M is an integer greater than 1. Hereinafter the example of training sequences will be described in more detail with reference to FIGS. 8 and 9.

Next, the transmission training stage is entered. The transmission training stage generally includes steps S104-S108.

In step S104, the receiving stations $20_1$, $20_2$, ..., and $20_N$ fix antenna weight vectors of the respective receive antenna arrays to a certain RX AWV. This fixed RX AWV may be the same or different between the receiving stations. Further, this RX AWV may be the most common one, or may be selected in accordance with other selection criteria. For example, a receiving station $20_i$ may fix its receive antenna weight vectors to a column of $D_i$ using its AWV setting unit 203.

In step S105, during each of the allocated transmission training sub-slots, the transmitting stations $10_1$, $10_2$, ..., and $10_N$ extract one different column of TX AWV from their respective TX codebooks, apply the extracted TX AWV to their respective transmit antenna arrays so as to adjust the phase (and amplitude) of each of the antenna elements, and transmit the respective training sequences via the respective transmit antenna arrays substantially at the same time.

For example, a transmitting station $10_i$ applies the $k^{th}$ (k=1, 2, ..., $t_i$) TX AWV (for example, the $k^{th}$ column of $W_i$) to its transmit antenna array using its AWV setting unit $102_i$ during the $k^{th}$ transmission training sub-slot, and transmits training sequence $TS_i$ via each of antenna elements of its transmit antenna array using its training sequence transmitting unit $103_i$. At the same time, other transmitting stations in the system conduct similar operations during the $k^{th}$ transmission training sub-slot.

In step S106, correspondingly, each of the receiving stations $20_1$, $20_2$, ..., and $20_N$, in the case where their RX AWVs are fixed, receives the training sequence transmitted from each of the transmitting stations $10_1$, $10_2$, ..., and $10_N$. For example, the receiving station $20_i$ receives training sequences via its receive antenna array using its training sequence receiving unit $204_i$. Here, in addition to receiving the training sequence transmitted from the transmitting station $10_i$ corresponding to itself (i.e., the signal of the own link), the receiving station $20_i$ also receives training sequences transmitted from other transmitting stations in the system (i.e., the signals of the cross links).

Assume that during the entire transmission training slot, the training sequences transmitted from the $q^{th}$ transmitting station $10_q$ and received by the receiving station $20_i$ via its receive antenna array constitute a matrix $TR_{i,q}$ (i=1, 2, ..., N, q=1, 2, ..., N) as shown below:

$$TR_{i,q} = [tr_{i,q,1}\ tr_{i,q,2}\ \cdots\ tr_{i,q,k}\ \cdots\ tr_{i,q,t_q}] = \quad \text{(Equation 3)}$$

$$\begin{bmatrix} tr_{i,q,1,1} & tr_{i,q,2,1} & \cdots & tr_{i,q,k,1} & \cdots & tr_{i,q,t_q,1} \\ tr_{i,q,1,2} & tr_{i,q,2,2} & \cdots & tr_{i,q,k,2} & \cdots & tr_{i,q,t_q,2} \\ \vdots & \vdots & \vdots & \vdots & \vdots & \vdots \\ tr_{i,q,1,s} & tr_{i,q,2,s} & \cdots & tr_{i,q,k,s} & \cdots & tr_{i,q,t_q,s} \\ \vdots & \vdots & \vdots & \vdots & \vdots & \vdots \\ tr_{i,q,1,M} & tr_{i,q,2,M} & \cdots & tr_{i,q,k,M} & \cdots & tr_{i,q,t_q,M} \end{bmatrix}$$

where s is a symbol index and s=1, 2, ..., M; and k is an index of a sub-slot, k=1, 2, ..., $t_i$.

Using $x_{i,q,s}^T$ to represent one row of the matrix above, $x_{i,q,s}^T$ may be referred to as a specific transmission weighted channel impulse response (CIR), which is a kind of channel information, is measured by the receiving station $20_i$; and may be expressed as follows:

$$x_{i,q,s}^T = d_i^T h_s W_q \quad \text{(Equation 4)}$$

where $d_i$ is the fixed RX AWV of receiving station $20_i$ during the transmission training time slot, $h_s$ represents the multi-input multi-output (MIMO) CIR at the $s^{th}$ symbol timing, and $W_q$ is the TX codebook of the IP transmitting station $10_q$.

Then in step S107, each of the receiving stations $20_1$, $20_2$, ..., and $20_N$, regarding its own link and cross links, further acquires (estimates) channel information regarding channel conditions of the links, and informs the acquired channel information and the size of its RX codebook (e.g., the number of columns) to the coordinator 30. For example, a receiving station $20_i$ may acquire the aforementioned channel information using its calculating unit $202_i$, and feedback the acquired channel information and the size of its RX codebook to the coordinator 30 using its coordinator interacting unit $201_i$.

The aforementioned channel information may include any one of channel impulse response (CIR), average frequency domain channel response (CR) over all sub-carriers, and CR covariance matrix over all sub-carriers.

Specifically, the channel impulse response (CIR) of the link between the receiving station $20_i$ of the $i^{th}$ communication pair and the IP transmitting station $10_q$ with respect to the $s^{th}$ symbol is the $x_{i,q,s}^T$ as mentioned above.

The CIR above may be converted into frequency domain channel response $X_{i,q,c}^T$ of the $c^{th}$ sub-carrier, which may be expressed as:

$$X_{i,q,c}^T = d_i^T H_c W_q \quad \text{(Equation 5)}$$

where c is the index of a sub-carrier, c=1, 2, ..., C, and C represents the total number of sub-carriers.

The average frequency domain channel response (CR) over all sub-carriers, $CR_{i,q}$, may be obtained by the equation below:

$$CR_{i,q} = E(X_{i,q,c}^T) = \frac{1}{C}\sum_c X_{i,q,c}^T \quad \text{(Equation 6)}$$

The CR covariance matrix $CM_{i,q}$ may be obtained by the equation below:

$$CM_{i,q} = E(X_{i,q,c}^* X_{i,q,c}^T) = \frac{1}{C}\sum_c X_{i,q,c}^* X_{i,q,c}^T \quad \text{(Equation 7)}$$

Each of the receiving station $20_i$ (i=1, 2, ..., N) takes $x_{i,q,s}^T$ (q=1, 2, ..., N, s=1, 2, ..., M) or $CR_{i,q}$ (q=1, 2, ..., N) or $CM_{i,q}$ (q=1, 2, ..., N) as channel information, and feedbacks it together with its RX codebook size (the number of columns) r, to the coordinator 30. Note that there would be no need for the receiving stations to notify the size of RX codebooks to the coordinator 30 if the coordinator 30 has previously been informed of the RX codebook of each of the receiving station in the system by a certain method. In addition, in one implementation, the channel information may be further quantified in order to reduce overhead.

In step S108, upon receiving the channel information and the size of the RX codebook fed back from each of the receiving stations $20_1$, $20_2$, ..., and $20_N$, the coordinator 30 calculates an optimized TX AWV and a SLNR serving as a measure of link leakage condition for each of the communication pairs, schedules a reception training time slot, and informs the calculated optimized TX AWV to the transmitting stations $10_1$, $10_2$, ..., and $10_N$, and at the same time inform the scheduled reception training time slot to each of the transmitting stations $10_1$, $10_2$, ..., and $10_N$ and receiving stations $20_1$, $20_2$, ..., and $20_N$. For example, the coordinator 30 may receive feedbacks from each of the receiving stations using its station interacting unit 301, calculate the optimized TX AWV and the SLNR using its calculating unit 303, schedule the reception training time slot using the scheduling unit 302, inform the calculated TX AWVs to the transmitting stations using its station interacting unit 301, and informs the scheduled reception training time slot to the transmitting stations and receiving stations.

Specifically, the optimized TX AWV of a transmitting station $10_i$ of the $i^{th}$ communication pair may be calculated by the equation below:

$$w_i' = eig\left\{\left(\left(\sum_{1 \leq q \leq N, q \neq i} R_{i,q}\right) + N_0 I\right)^{-1} R_{i,i}\right\} \quad \text{(Equation 8)}$$

where the eig (.) represents the largest eigenvectors, and $N_0$ is the single sided power spectral density (PSD) of the additive white Gaussian noise (AWGN).

If what is fed back from the receiving stations is CIR, the coordinator 30 may firstly calculate the average frequency domain channel response or CR covariance matrix using Equation 6 or Equation 7 above, and then calculate $R_{i,q}$ in the above equation using Equation 9 or Equation 10 below. If what is fed back from the receiving stations is the average channel response $CR_{i,q}$ or the CR covariance matrix $CM_{i,q}$, then the coordinator 30 may calculate $R_{i,q}$ in the above equation using Equation 9 or Equation 10 below directly.

$$R_{i,q} = W_i CR_{i,q} CR_{i,q}^H CR_{i,q} W_i^H \quad \text{(Equation 9)}$$

$$R_{i,q} = W_i CM_{i,q} W_i^H \quad \text{(Equation 10)}$$

Then, the coordinator 30 may calculate the transmission $SLNR_i$ of the i communication pair using the equation below:

$$SLNR_i = \frac{w_i'^H R_{i,i} w_i'}{\sum_{1 \leq q \leq N, q \neq i} w_i'^H R_{i,q} w_i' + N_0 I} \quad \text{(Equation 11)}$$

In addition, the coordinator 30 may schedule the following reception training time slot with reference to the RX codebook sizes informed form the receiving stations $20_1$, $20_2$, ..., and $20_N$. The scheduled reception training time slot may include RN sub-slots. RN equals to the maximum number of columns of the RX codebook matrix of all N receiving stations $20_1$, $20_2$, ..., and $20_N$ in the wireless communication system 1; i.e. equals to the number of receive antenna elements of the receiving station having the most receive antenna elements.

Then, the coordinator 30 informs the optimized TX AWV calculated for the i communication pair (i.e. $w'_i$) to the transmitting station $10_i$, and informs the scheduled reception training time slot to the transmitting stations and receiving stations.

Next, the reception training stage is entered. The stage of reception training generally includes steps S109-S111.

Specifically, in step S109, each of the transmitting stations $10_1, 10_2, \ldots,$ and $10_N$ fixes its transmit antenna weight vectors to the optimized TX AWV informed from the coordinator 30. That is, the transmitting station $10_i$ fixed its transmit antenna weight vectors to $w'_i$. With the transmit antenna vectors fixed to the optimized TX AWV, the transmitting stations $10_1$, $10_2, \ldots,$ and $10_N$ transmits the corresponding training sequence $TS_i$ at substantially the same time during each reception training sub-slot. For example, each transmitting station $10_i$ applies $w'_i$ to its transmit antenna array using its AWV setting unit $102_i$ during RN scheduled reception training sub-slots, and transmits training sequence $TS_i$ using its training sequence transmitting unit $103_i$ via each antenna element of its transmit antenna array.

Then, in step S110, each of the receiving stations $20_1$, $20_2, \ldots,$ and $20_N$ switches its RX AWV during each reception training sub-slot, and receives training sequences transmitted from the transmitting stations.

For example, a receiving station $20_i$ applies the $k^{th}$ RX AWV to its receive antenna array using its AWV setting unit $203_i$ during the $k^{th}$ ($k=1, 2, \ldots, r_i$) reception training sub-slot (for example, the $k^{th}$ column of $D_i$), and receives training sequences transmitted from the transmitting stations via its receive antenna array using its training sequence receiving unit $204_i$.

Here, in addition to receiving the training sequence transmitted from the transmitting station $10_i$ corresponding to itself (i.e., the signal of the own link), the receiving station $20_i$ also receives training sequences transmitted from other transmitting stations in the system (i.e., the signals of the cross links).

Assume that during the entire reception training slot, the training sequences received by the receiving station $20_i$ via its receive antenna array and transmitted from the $q^{th}$ transmitting station $10_q$ constitute a matrix $RR_{i,q}$ ($i=1, 2, \ldots, N$, $q=1, 2, \ldots, N$) as shown below:

$$RR_{i,q} = \begin{bmatrix} rr_{i,q,1}^T \\ rr_{i,q,2}^T \\ \vdots \\ rr_{i,q,k}^T \\ \vdots \\ rr_{i,q,r_i}^T \end{bmatrix} = \quad \text{(Equation 12)}$$

$$\begin{bmatrix} rr_{i,q,1,1} & rr_{i,q,1,2} & \cdots & rr_{i,q,1,s} & \cdots & rr_{i,q,1,M} \\ rr_{i,q,2,1} & rr_{i,q,2,2} & \cdots & rr_{i,q,2,s} & \cdots & rr_{i,q,2,M} \\ \vdots & \vdots & \vdots & \vdots & \vdots & \vdots \\ rr_{i,q,k,1} & rr_{i,q,k,2} & \cdots & rr_{i,q,k,s} & \cdots & rr_{i,q,k,M} \\ \vdots & \vdots & \vdots & \vdots & \vdots & \vdots \\ rr_{i,q,r_i,1} & rr_{i,q,r_i,2} & \cdots & rr_{i,q,r_i,s} & \cdots & rr_{i,q,r_i,M} \end{bmatrix}$$

where s is a symbol index and $s=1, 2, \ldots, M$; and k is an index of a sub-slot, $k=1, 2, \ldots, r_i$.

Using $y_{i,q,s}$ to represent one column of the matrix above, $y_{i,q,s}$ may be referred to as specific reception weighted channel impulse response (CIR), which is a kind of channel information, is measured by the receiving station $20_i$ and may be expressed as follows:

$$y_{i,q,s} = D_i^T h_s w'_q \quad \text{(Equation 13)}$$

where $D_i$ is the RX codebook of the receiving station $20_i$, $h_s$ represents the multi-input multi-output (MIMO) CIR at the $s^{th}$ symbol timing, and $w'_q$ is the fixed TX AWV of the $q^{th}$ transmitting station $10_q$ during the reception training stage.

In step S111, each of the receiving stations $20_1, 20_2, \ldots,$ and $20_N$, regarding its own link and cross links, further acquires (estimates) channel information regarding channel conditions of the links, calculates the optimized RX AWV and the SLNR serving as a measure of link quality of each of the links, and then feedbacks the calculated SLNR to the coordinator 30. For example, a receiving station $20_i$ may derive the aforementioned channel information, optimized RX AWV and SINR using its calculating unit $202_i$, and feedback the calculated SLNR to the coordinator 30 using its coordinator interacting unit $201_i$.

The aforementioned channel information may include any one of channel impulse response (CIR), average frequency domain channel response (CR) over all sub-carriers, and CR covariance matrix over all sub-carriers.

Specifically, the channel impulse response (CIR) of the link between the receiving station $20_i$ of the $i^{th}$ communication pair and the $q^{th}$ transmitting station $10_q$ with respect to the $s^{th}$ symbol is the $y_{i,q,s}$ as mentioned above.

The CIR may be converted into the frequency domain channel response $Y_{i,q,r}$ of the $c^{th}$ sub-carrier, which may be expressed as:

$$Y_{i,q,c} = D_i^T H_c w'_q \quad \text{(Equation 14)}$$

where c is the index of a sub-carrier, $c=1, 2, \ldots, C$, and C represents the total number of sub-carriers.

The average frequency domain channel response over all sub-carriers, $CR_{i,q}$, may be obtained by the equation below:

$$CR_{i,q} = E(Y_{i,q,c}) = \frac{1}{C} \sum_c Y_{i,q,c} \quad \text{(Equation 15)}$$

The CR covariance matrix $CM_{i,q}$ may be obtained by the equation below:

$$CM_{i,q} = E(Y_{i,q,c} Y_{i,q,c}^H) = \frac{1}{C} \sum_c Y_{i,q,c} Y_{i,q,c}^H \quad \text{(Equation 16)}$$

A receiving station $20_i$ further calculates the optimized RX AWV for the communication between itself and the transmitting station $10_i$ using the equation below:

$$d'_i = eig\left\{ \left( \left( \sum_{1 \leq q \leq N, q \neq i} \bar{R}_{i,q} \right) + N_0 I \right)^{-1} \bar{R}_{i,i} \right\} \quad \text{(Equation 17)}$$

where the eig (.) represents the largest eigenvectors, and $N_0$ is the single sided power spectral density (PSD) of the additive white Gaussian noise (AWGN). Depending on whether the receiving station $20_i$ calculates the average frequency domain channel response $CR_{i,q}$ or the CR covariance matrix $CM_{i,q}$, the $R_{i,q}$ in the equation above may be calculated as shown below:

$$\bar{R}_{i,q} = D_i^* CR_{i,q} CR_{i,q}^H D_i^T \quad \text{(Equation 18)}$$

$$\bar{R}_{i,q} = D_i^* CM_{i,q} D_i^T \quad \text{(Equation 19)}$$

Then the receiving station $20_i$ calculates the reception $SLNR_i$ of the $i^{th}$ communication pair using the equation below:

$$SINR_i = \frac{d_i'^T \bar{R}_{i,i} d_i'^*}{\sum_{1 \le q \le N, q \ne i} d_i'^T \bar{R}_{i,q} d_i'^* + N_0 I} \quad \text{(Equation 20)}$$

SLNR$_i$ may serve as a measure of link quality of the link between the i$^{th}$ communication pair. Then the receiving station $20_i$ feeds back the calculated SLNR$_i$ to the coordinator 30.

Finally, during the determination stage (including steps S112-S115), in step S112, the coordinator 30 evaluates link quality of each link by comparing the SINR fed back from each of the receiving stations $20_1$, $20_2$, . . . , and $20_N$ and a corresponding predetermined threshold value γ of each of the communication pairs. For example, the coordinator 30 receives the SINR fed back from the receiving station $20_i$ via the station interacting unit 301, and compares the SLNR$_i$ of the i$^{th}$ communication pair fed back from the receiving station $20_i$ with the threshold value $γ_i$ of the i$^{th}$ communication pair using the spatial multiplexing determining unit 304.

In step S113, the coordinator 30 determines whether or not spatial multiplexing can be conducted, or whether or not it is necessary to conduct re-training based on the evaluation result on link quality in step S112. For example, the coordinator 30 determines whether or not spatial multiplexing can be conducted using its spatial multiplexing determining unit 304.

Specifically, the coordinator 30 determines that spatial multiplexing can be conducted if it is found in step 112 that the SINRs of all communication pairs are greater than or equal to their corresponding threshold values γ, and then the method proceeds to step S114. Otherwise, the coordinator 30 determines that it is necessary to conduct beamforming training based on spatial multiplexing again if any one of the communication pairs has a SINR less than its corresponding threshold γ, and then the method proceeds to step S115.

In step S114, the coordinator 30 informs available service periods for spatial multiplexing to each of the transmitting stations $10_1$, $10_2$, . . . , and $10_N$ and the receiving stations $20_1$, $20_2$, . . . , and $20_N$. Then the beamforming training process ends. Thereafter, the transmitting station $10_i$ and the receiving station $20_i$ may use the w'$_i$ and d'$_i$ they obtained during the beamforming training process as TX AWV and RX AWV respectively to perform data communication with each other.

On the other hand, in step S115, the coordinator 30 excludes one or more communication pairs in accordance with a criteria based on leakage conditions of the respective links between the transmitting stations $10_1$, $10_2$, . . . , and $10_N$ and the receiving stations $20_1$, $20_2$, . . . , and $20_N$. For example, the coordinator 30 may discard the communication pair having the smallest SLNR. Then, the process returns to step S108, and step S108 and the subsequent steps are repeated with respect to the remaining N-1 pairs of transmitting stations and receiving stations to conduct re-training with the communication pair having the smallest SLNR excluded until a positive result is obtained in step S113.

Figure 4:
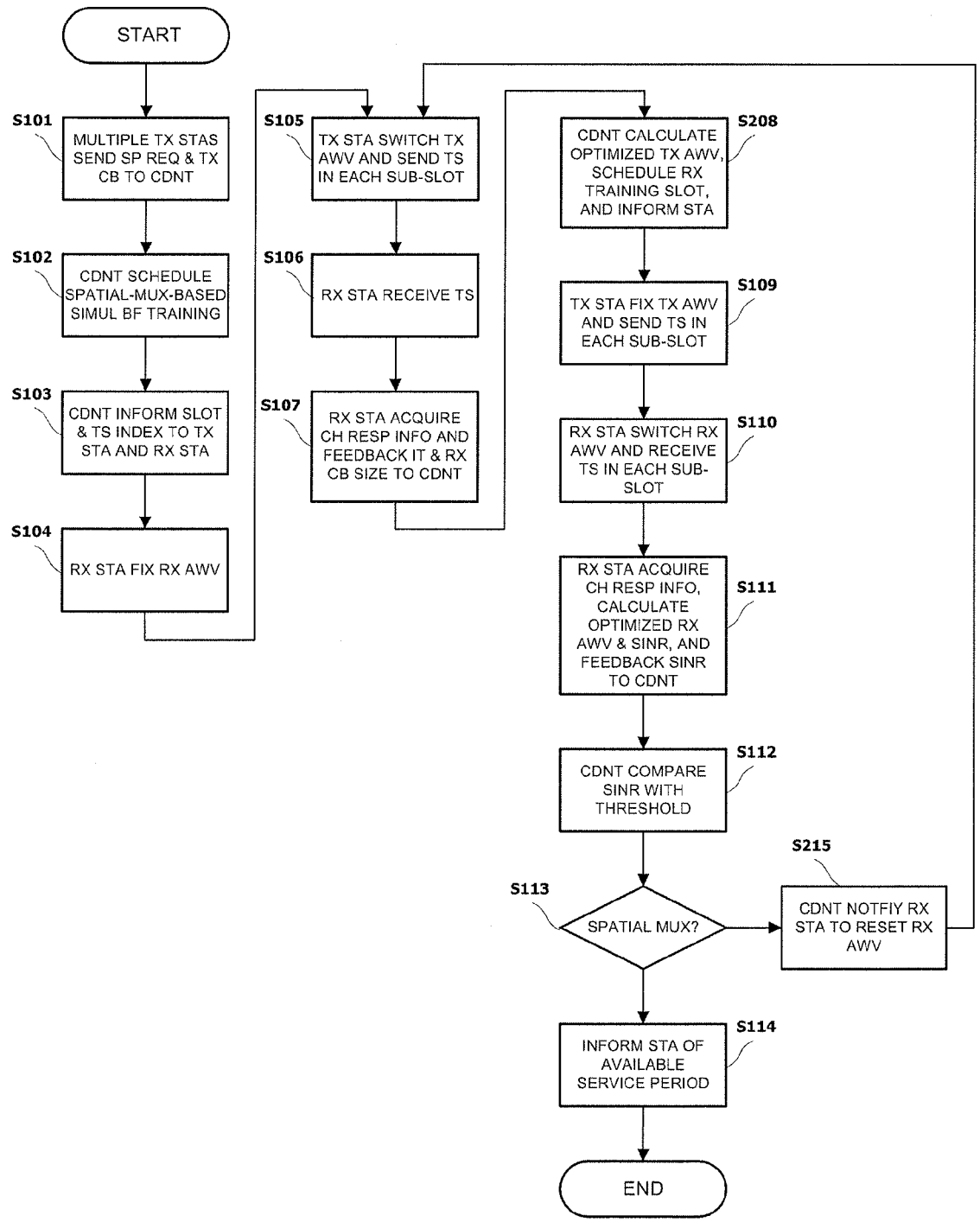
FIG. 4 shows a flow chart of a method for proactive simultaneous beamforming training according a second embodiment of the invention.

FIG. 4 shows a flow chart of a method for proactive simultaneous beamforming training according to a second embodiment of the invention.

The difference between the method according the second embodiment and the method according to the first embodiment as shown in FIG. 3 lies in that steps S208 and S215 replace steps S108 and S115 respectively.

Specifically, according to the second embodiment, in step S208, the coordinator 30 does not need to calculate SLNR of each communication pair like in step S108.

Further, if in step S113, the coordinator 30 determines that spatial multiplexing cannot be conducted based on the comparison result in the step S112, that is, it is necessary to conduct beamforming training again, then the method proceeds to step S215.

In step S215, the coordinator 30 informs each of the receiving stations $20_1$, $20_2$, . . . , and $20_N$ to fix its RX AWVs to the optimized RX AWV calculated in step S111. For example, coordinator 30 informs a receiving station $20_i$ to fix its RX AWVs to d'$_i$ using the station interacting unit 301. Then, the process returns to step S105, repeats step S105 with the RX AWVs of each of the receiving stations reset to the optimized RX AWV, and then repeats the steps subsequent to step S105 to conduct re-training, until a positive result is obtained in step S113.

Note that the first embodiment and the second embodiment can be combined. That is, if in step S113 the coordinator 30 determines that it is necessary to continue beamforming training, then the coordinator 30 may discard the communication pair having the smallest SLNR as well as inform the receiving stations of the remaining communication pairs to fix their RX AWVs to the optimized RX AWV calculated in step S111. Then the process returns to step S105, and step S105 and the subsequent steps are repeated.

The case where multiple pairs of communication stations in the system proactively initiate a service period request almost simultaneously has been described above. However, it is not necessary for the multiple communication pairs in the system to initiate a service period request simultaneously. Instead, they may initiate a service period request any time as desired.

Figure 5:
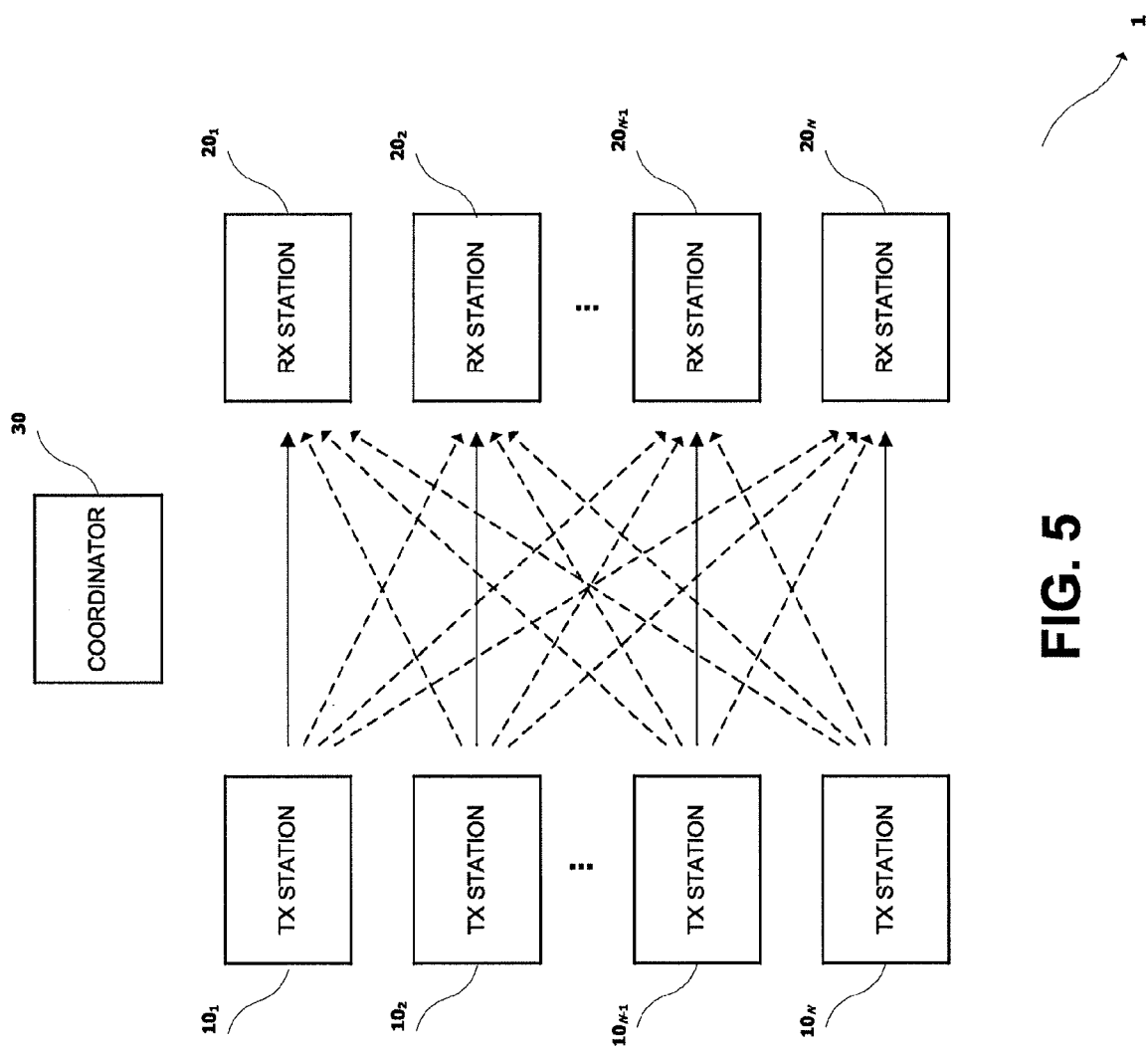
FIG. 5 shows a schematic diagram of a wireless communication system in the case of on-demand simultaneous beamforming training.

Next, this case will be described in connection with FIGS. 5-7. FIG. 5 shows a schematic diagram of a wireless communication system 1 in the case of this on-demand simultaneous beamforming training.

As shown in FIG. 5, the 1$^{st}$, 2$^{nd}$ and (N-1)$^{th}$ communication pairs in the system have gone through beamforming training; and are now performing data communication. At this time, one or more additional communication pairs (e.g. the N$^{th}$ communication pair) initiate a request for service period (SP) and transmit their TX codebooks to the coordinator 30. Upon receiving the request from the N$^{th}$ communication pair, the coordinator 30 comprehensively considers the condition of the system including the 1$^{st}$, 2$^{nd}$ (N-1)$^{th}$ N$^{th}$ pairs of communication stations to schedule spatial-multiplexing-based simultaneous beamforming training in accordance with service period availability. Then, all the N communication pairs in the system perform the simultaneous beamforming training as described above.

Figure 6:
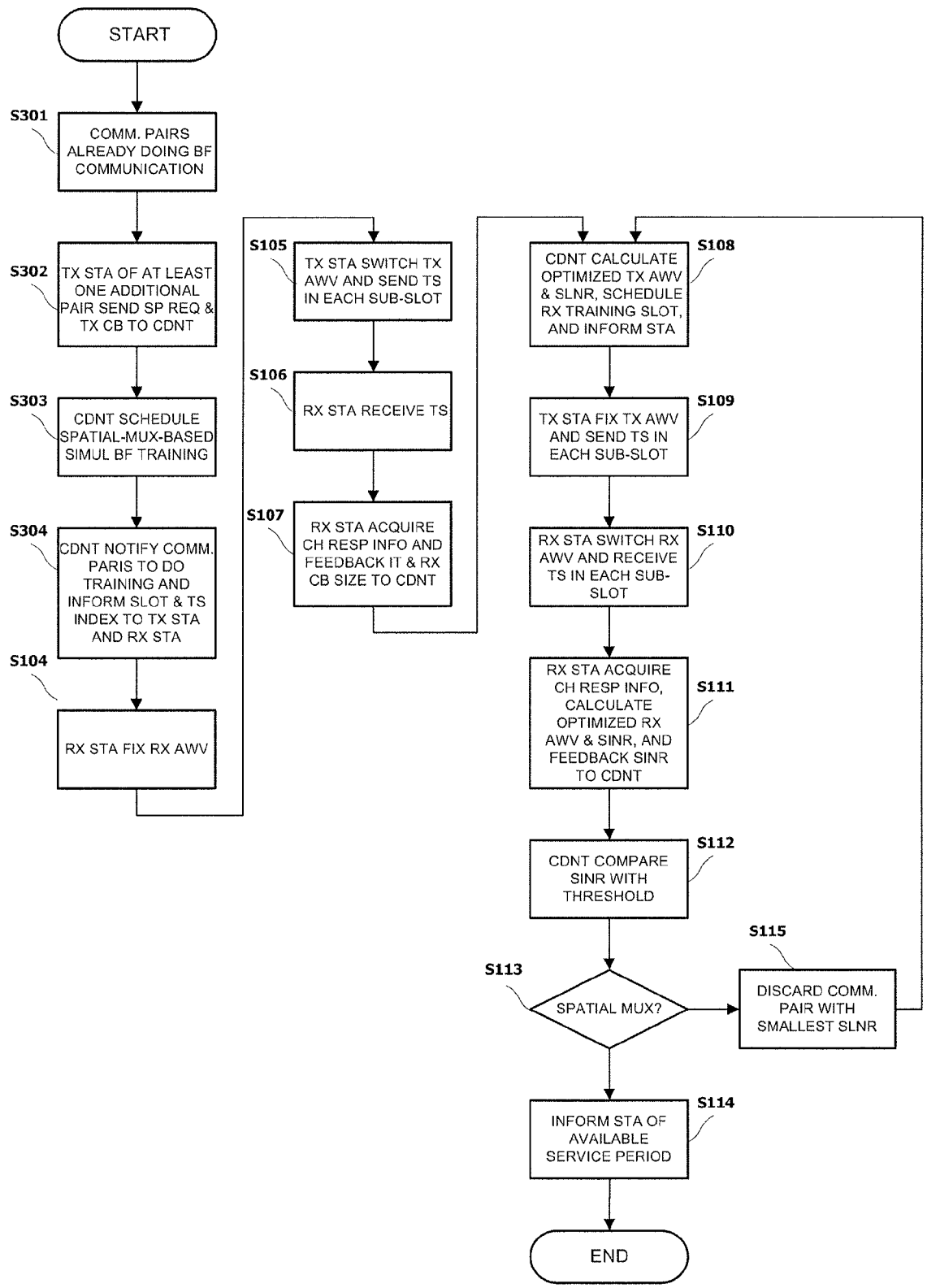
FIG. 6 shows a flow chart of a method for simultaneous beamforming training according a third embodiment of the invention.

FIG. 6 shows a flow chart of a method for simultaneous beamforming training according a third embodiment of the invention.

The difference between the method according to the third embodiment and the method according to the first embodiment as shown in FIG. 3 lies in that steps S301-S304 replace steps S101-S103.

Specifically, according to the third embodiment, in step S301, there are already one or more pairs of communication stations in the system that have gone through beamforming training and are performing data communication for example.

In step S302, a transmitting station of at least one additional pair of communication stations transmits a service period request and a corresponding TX codebook to the coordinator 30.

In step S303, upon receiving the service period request from the at least one additional pair of communication stations, the coordinator 30 comprehensively considers conditions of all communication pairs in the system, schedules spatial-multiplexing-based simultaneous beamforming training in accordance with service period availability, and informs all communication pairs in the system that beamforming training will be re-conducted; meanwhile it informs the scheduled training time slot and the training sequence index allocated to each of the communication pairs to the transmitting station and receiving station of each of the communication pairs.

Then, in steps S104-S115, each of the communication pairs performs simultaneous beamforming training in a manner similar to that of the first embodiment, with the assistance and coordination from the coordinator 30.

Figure 7:
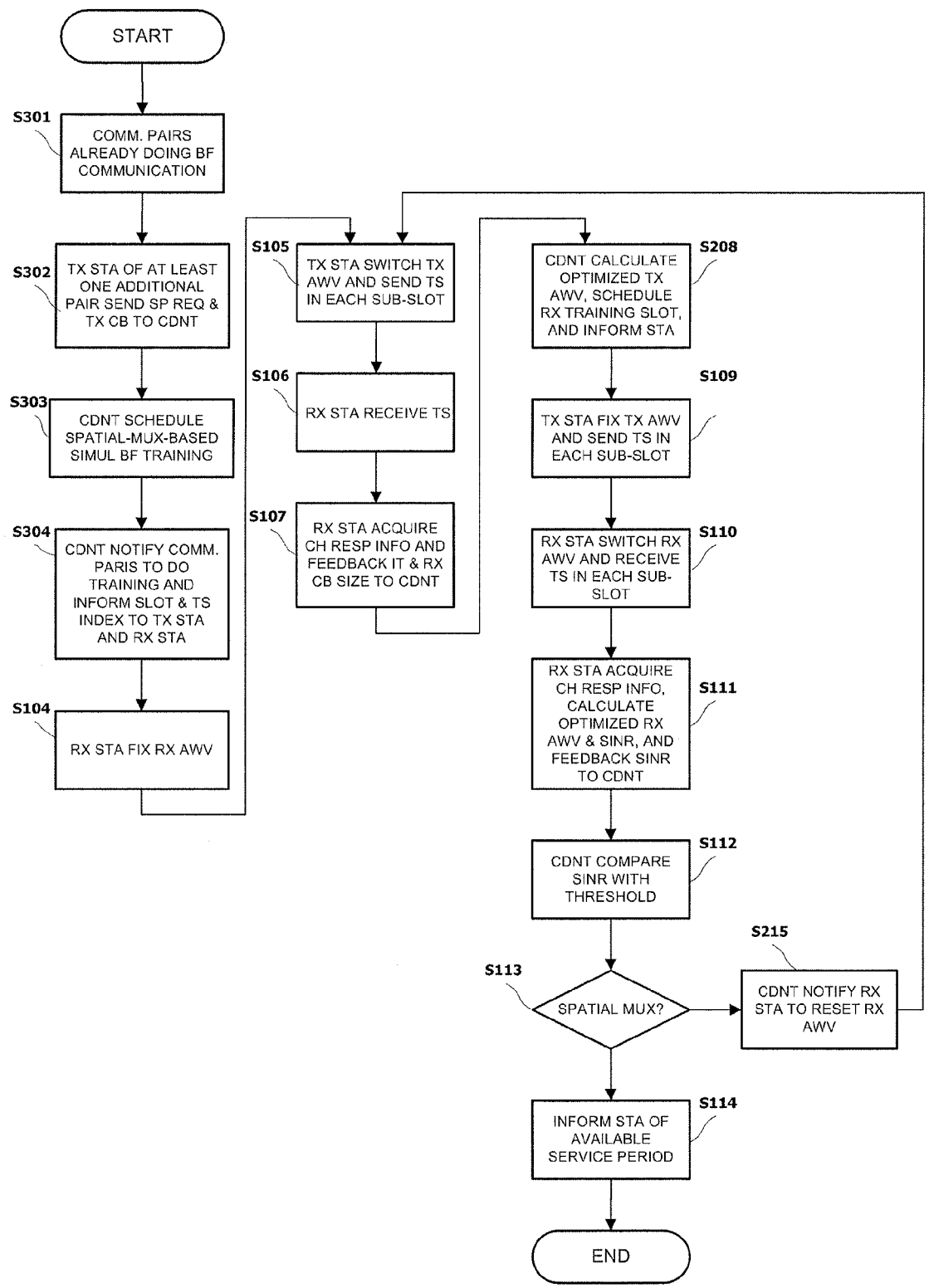
FIG. 7 shows a flow chart of a method for simultaneous beamforming training according a fourth embodiment of the invention.

FIG. 7 shows a flow chart of a method for simultaneous beamforming training according a fourth embodiment of the invention.

The difference between the method according to the fourth embodiment and the method according to the third embodiment as shown in FIG. 6 lies in that steps S208 and S215 replace steps S108 and S115 respectively. In the description of the second embodiment above, description of the steps S208 and S215 has been given, and will not be repeated here.

Similarly, the third embodiment and the fourth embodiment may be combined. That is, if the coordinator 30 determines that it is necessary to continue beamforming training, then the coordinator 30 may discard the communication pair having the smallest SLNR as well as inform the receiving station of each of the remaining communication pair to fix its RX AWVs to the calculated optimized RX AWV. Then the process returns to step S105, and step S105 and the subsequent steps are repeated.

FIG. 8 shows an example of training sequences that can be used in the invention. As shown in FIG. 8, training sequences may include complementary Golay sequences. A basic Golay sequence $G=[Ga\ Gb]^T$ comprises two complementary sequences $Ga=[Ga_1\ Ga_2\ \ldots\ Ga_{N\_MAX}]^T$ and $Gb=[Gb_1\ Gb_2\ \ldots\ Gb_{N\_MAX}]^T$, where each of $Ga_v$ and $Gb_v$ (v=1, ..., N_MAX), per se, is a symbol sequence including S symbols. N_MAX represents the maximum number of communication pairs allowed to be simultaneously trained in the system. When allocating indices, it is assumed that the coordinator 30 allocates a training sequence index i for the $i^{th}$ communication pair. Upon being informed of the index i, each communication pair may derive the training sequence associated with the own communication pair as follows:

the $1^{st}$ communication pair:

$$TS_1=[Ga_1 Ga_2 \ldots Ga_{N\_MAX}]^T$$

the $2^{nd}$ communication pair:

$$TS_2=[Ga_{N\_MAX}Ga_1 \ldots Ga_{N\_MAX-1} Gb_{N\_MAX}Gb_1 \ldots G_{N\_MAX-1}]^T$$

the $i^{th}$ communication pair (i=3, 4 ..., N):

$$TS_i=[Ga_{N\_MAX-i+2}Ga_{N\_MAX-i+3} \ldots Ga_{N\_MAX-i+1}Gb_{N\_MAX-i+2}Gb_{N\_MAX-i+3} Gb_{N\_MAX-i+1}]^T$$

All the training sequences derived by the communication pairs are orthogonal to each other.

Further, as shown in FIG. 8, a cyclic prefix and/or a cyclic postfix may be appended to both ends of the two complementary sequences in the training sequence of each of the communication pairs to adjust, for example, any tolerable timing error resulted from channel and hardware.

Note that training sequences can always be transmitted using the single-carrier mode.

In addition, the length S of $Ga_v$ and $Gb_v$ depends on the maximum channel order L (normalized by the chip length (i.e. the time length of each symbol included in $Ga_v$ or $Gb_v$), where S>=L.

Figure 9:
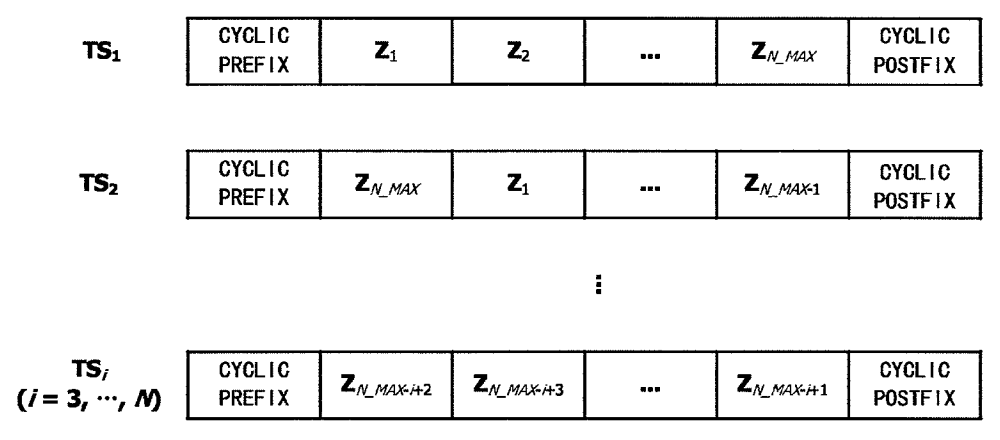

FIG. 9 shows another example of training sequences that can be used in the invention. As shown in FIG. 9, training sequences may include Zadoff-Chu sequences. A basic Zadoff-Chu sequence may be expressed as $Z=[Z_1\ Z_2\ \ldots\ Z_{N\_MAX}]^T$, where $Z_v$ (v=1, ..., N_MAX), per se, is a symbol sequence, which includes S symbols. N_MAX represents the maximum number of communication pairs allowed to be trained simultaneously in the system. When allocating indices, it is assumed that the coordinator 30 allocates a training sequence index i for the $i^{th}$ communication pair. Upon being informed of the index i, each communication pair may derive the training sequence associated with the own communication pair as follows:

the $1^{st}$ communication pair:

$$TS_1=[Z_1Z_2 \ldots Z_{N\_MAX}]^T$$

the $2^{nd}$ communication pair:

$$TS_2=[Z_{N\_MAX}Z_1 \ldots Z_{N\_MAX-1}]^T$$

the $i^{th}$ communication pair (i=3, 4 ..., N):

$$TS_i=[Z_{N\_MAX-i+2}Z_{N\_MAX-i+3} \ldots Z_{N\_MAX-i+1}]^T$$

All the training sequences derived by the communication pairs are orthogonal to each other.

Further, as shown in FIG. 9, a cyclic prefix and/or a cyclic postfix may be appended to both ends of the Zadoff-Chu sequence included in the training sequence of each of the communication pairs to adjust, for example, any tolerable timing error resulted from channel and hardware.

Similarly as what is described above, in the case where a Zadoff-Chu sequence is used as a training sequence, training sequences can also always be transmitted using the single-carrier mode.

In addition, the length S of $Z_v$ depends on the maximum channel order L (normalized by the chip length (i.e. the time length of each symbol included in $Z_v$), where S>=L.

Some specific embodiments of the invention have been described above, for the purpose of illustration rather than limitation. However, the present invention is not limited to the described embodiments. Those skilled in the art would understand that various modifications, combinations and substitutions may be done to the present invention, and that the present invention encompasses such modifications, combinations and substitutions as fall within the scope of the appended claims.

What is claimed is:

1. A wireless communication system, comprising:
a plurality of transmitting stations each including a transmit antenna array, the plurality of transmitting stations transmitting training sequences via the respective transmit antenna arrays in the same period of time;
a plurality of receiving stations corresponding to the plurality of transmitting stations respectively and each including a receive antenna array, each of the plurality of receiving stations receiving the respective training sequences transmitted by the plurality of transmitting stations via the respective receive antenna array and acquiring channel information regarding channel conditions of the respective links between the receiving station and the respective ones of the plurality of transmitting stations, the channel information being used to determine at least one of optimized transmit antenna weight vectors of the transmit antenna arrays of the plurality of transmitting stations and optimized receive antenna weight vectors of the receive antenna arrays of the plurality of receiving stations; and a coordinator, which receives the channel information from the plurality of receiving stations as feedback, and evaluates link qualities of the respective links between the plurality of transmitting stations and the plurality of receiving stations based on the channel information fed back from the plurality of receiving stations to determine whether it is necessary to conduct re-training or not, and wherein the plurality of transmitting stations transmit training sequences via the respective transmit antenna arrays while switching or fixing the respective transmit antenna weight vectors in the same period of time.

2. The wireless communication system of claim 1, wherein each of the plurality of receiving stations receives the respective training sequences transmitted by the plurality of transmitting stations via the respective receive antenna array while fixing the respective receive antenna weight vector, and acquires the channel information regarding channel conditions of the respective links between the receiving station and the respective ones of the plurality of transmitting stations, the channel information being used to determine the optimized transmit antenna weight vectors of the transmit antenna arrays of the plurality of transmitting stations.

3. The wireless communication system of claim 1, wherein each of the plurality of receiving stations receives the respective training sequences transmitted by the plurality of transmitting stations via the respective receive antenna array while switching the respective receive antenna weight vector, and acquires the channel information regarding channel conditions of the respective links between the receiving station and the respective ones of the plurality of transmitting stations, the channel information being used to determine the optimized receive antenna weight vectors of the receive antenna arrays of the plurality of receiving stations.

4. The wireless communication system of claim 1, wherein, in the case that the coordinator determines that it is necessary to conduct the re-training, the re-retraining is conducted based on at least one of the optimized transmit antenna weight vectors and the optimized receive antenna weight vectors determined in a previous training.

5. The wireless communication system of claim 1, wherein, in the case that the coordinator determines that it is necessary to conduct re-training, a pair of transmitting station and receiving station among the plurality of transmitting stations and the plurality of receiving stations is excluded in accordance with a criteria based on leakage conditions of the respective links between the plurality of transmitting stations and the plurality of receiving stations, and the re-training is conducted with respect to the remaining transmitting stations and receiving stations.

6. The wireless communication system of claim 1, wherein the coordinator schedules training time slots for the plurality of transmitting stations and the plurality of receiving stations according to requests from the plurality of transmitting stations.

7. The wireless communication system of claim 1, wherein the coordinator schedules training time slots for the plurality of transmitting stations and the plurality of receiving stations according to a request from one the plurality of transmitting stations.

8. The wireless communication system of claim 1, wherein each of the training sequences includes one of a complementary Golay sequence or a Zadoff-Chu sequence.

9. The wireless communication system of claim 8, wherein each of the training sequences further includes at least one of a cyclic prefix and a cyclic postfix.

10. A method for conducting beamforming training in a wireless communication system including a plurality of transmitting stations and a plurality of receiving stations corresponding to the plurality of transmitting stations respectively, comprising:

a training sequence transmitting step in which the plurality of transmitting stations transmit training sequences via the respective transmit antenna arrays in the same period of time;

a training sequence receiving step in which each of the plurality of receiving stations receives the respective training sequences transmitted by the plurality of transmitting stations via the respective receive antenna array;

a channel information acquiring step of acquiring channel information regarding channel conditions of the respective links between each of the plurality of receiving stations and the respective ones of the plurality of transmitting stations;

an optimized antenna weight vector determining step of determining, based on the channel information, at least one of optimized transmit antenna weight vectors of the transmit antenna arrays of the plurality of transmitting stations and optimized receive antenna weight vectors of the receive antenna arrays of the plurality of receiving stations: and a re-training determining step of evaluating link qualities of the respective links between the plurality of transmitting stations and the plurality of receiving stations based on the acquired channel information to determine whether it is necessary to conduct re-training or not, wherein the training sequence step includes the plurality of transmitting stations transmitting training sequences via the respective transmit antenna arrays while switching or fixing the respective transmit antenna weight vectors in the same period of time.

11. The method of claim 10, wherein the training sequence receiving step includes each of the plurality of receiving stations receiving the respective training sequences transmitted by the plurality of transmitting stations via the respective receive antenna array while fixing the respective receive antenna weight vector, and the optimized antenna weight vector determining step includes determining the optimized transmit antenna weight vectors of the transmit antenna arrays of the plurality of transmitting stations based on the channel information.

12. The method of claim 10, wherein the training sequence receiving step includes each of the plurality of receiving stations receiving the respective training sequences transmitted by the plurality of transmitting stations via the respective receive antenna array while switching the respective receive antenna weight vector, and the optimized antenna weight vector determining step includes determining the optimized receive antenna weight vectors of the receive antenna arrays of the plurality of receiving stations based on the channel information.

13. The method of claim 10, further comprising:

in the case of determining that it is necessary to conduct the re-training, conducting the re-retraining based on at least one of the optimized transmit antenna weight vectors and the optimized receive antenna weight vectors determined in a previous training.

14. The method of claim 10, further comprising:
in the case of determining that it is necessary to conduct re-training, excluding a pair of transmitting station and receiving station among the plurality of transmitting stations and the plurality of receiving stations in accordance with a criteria based on leakage conditions of the respective links between the plurality of transmitting stations and the plurality of receiving stations, and conducting the re-training with respect to the remaining transmitting stations and receiving stations.

15. The method of claim 10, further comprising:
scheduling training time slots for the plurality of transmitting stations and the plurality of receiving stations according to requests from the plurality of transmitting stations.

16. The method of claim 10, further comprising:
scheduling training time slots for the plurality of transmitting stations and the plurality of receiving stations according to a request from one the plurality of transmitting stations.

17. The method of claim 10, wherein each of the training sequences includes one of a complementary Golay sequence or a Zadoff-Chu sequence.

18. The method of claim 17, wherein each of the training sequences further includes at least one of a cyclic prefix and a cyclic postfix.

* * * * *